US010214635B2

(12) United States Patent
Schwekendiek et al.

(10) Patent No.: US 10,214,635 B2
(45) Date of Patent: Feb. 26, 2019

(54) SULFUR-CROSSLINKABLE RUBBER MIXTURE AND VEHICLE TIRE

(71) Applicant: Continental Reifen Deutschland GmbH, Hannover (DE)

(72) Inventors: Kirsten Schwekendiek, Hannover (DE); Norbert Müller, Nienhagen (DE); Carla Recker, Hannover (DE); Julia Schoeffel, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 194 days.

(21) Appl. No.: 15/310,862

(22) PCT Filed: Mar. 18, 2015

(86) PCT No.: PCT/EP2015/055595
§ 371 (c)(1),
(2) Date: Nov. 14, 2016

(87) PCT Pub. No.: WO2015/172915
PCT Pub. Date: Nov. 19, 2015

(65) Prior Publication Data
US 2017/0073508 A1 Mar. 16, 2017

(30) Foreign Application Priority Data
May 15, 2014 (DE) .................. 10 2014 209 255

(51) Int. Cl.
| | | |
|---|---|---|
| *C08K 5/548* | (2006.01) | |
| *B60C 1/00* | (2006.01) | |
| *C08L 9/00* | (2006.01) | |
| *C08K 3/36* | (2006.01) | |
| *B29B 7/74* | (2006.01) | |
| *C08L 9/06* | (2006.01) | |
| *C08K 3/06* | (2006.01) | |
| *C08K 3/22* | (2006.01) | |
| *C08K 5/09* | (2006.01) | |
| *C08K 5/31* | (2006.01) | |
| *C08L 7/00* | (2006.01) | |
| *C08L 91/00* | (2006.01) | |

(52) U.S. Cl.
CPC .............. *C08L 9/00* (2013.01); *B29B 7/7495* (2013.01); *B60C 1/00* (2013.01); *B60C 1/0016* (2013.01); *C08K 3/06* (2013.01); *C08K 3/22* (2013.01); *C08K 3/36* (2013.01); *C08K 5/09* (2013.01); *C08K 5/31* (2013.01); *C08K 5/548* (2013.01); *C08L 7/00* (2013.01); *C08L 9/06* (2013.01); *C08L 91/00* (2013.01); *C08L 2205/02* (2013.01); *C08L 2205/03* (2013.01); *C08L 2312/00* (2013.01); *Y02T 10/862* (2013.01)

(58) Field of Classification Search
CPC .............................. C08K 5/548; B60C 1/0016
See application file for complete search history.

(56) References Cited

U.S. PATENT DOCUMENTS

| | | | |
|---|---|---|---|
| 8,987,353 B2 | 3/2015 | Longchambon et al. | |
| 9,388,201 B2 * | 7/2016 | Roben | C08K 5/548 |
| 9,527,873 B2 * | 12/2016 | Roben | C07F 7/1836 |
| 2004/0132880 A1 | 7/2004 | Durel et al. | |
| 2010/0036006 A1 | 2/2010 | Ota | |
| 2012/0041129 A1 | 2/2012 | Steinhauser et al. | |
| 2013/0172443 A1 | 7/2013 | Kushida et al. | |
| 2014/0107285 A1 | 4/2014 | Hirata et al. | |

FOREIGN PATENT DOCUMENTS

| | | | | |
|---|---|---|---|---|
| EP | 0738613 A1 * | 10/1996 | .......... | B60C 1/0016 |
| JP | H08295759 A | 11/1996 | | |
| JP | 2002 2012 13 A | 7/2002 | | |
| JP | 2002201312 A | 7/2002 | | |
| JP | 2004204176 A | 7/2004 | | |

OTHER PUBLICATIONS

Machine translation of JP 2002-201312 A, published Jul. 19, 2002. (Year: 2002).*

* cited by examiner

Primary Examiner — Vickey Nerangis
(74) Attorney, Agent, or Firm — David L. Cate

(57) ABSTRACT

The invention relates to a sulfur-crosslinkable rubber mixture, in particular for treads of vehicle tires, and to a vehicle tire. The rubber mixture contains at least the following components: at least one diene rubber and 10 to 200 phr of at least one silicic acid and 2 to 20 phf of at least one silane having general empirical formula I) $[(R^1)_3Si-X]_mS_n(R^2)_{2-m}$, wherein the residues $R^1$ within a molecule can be the same or different and are alkoxy groups having 1 to 10 carbon atoms or cyclic dialkoxy groups having 2 to 10 carbon atoms or cycloalkoxy groups having 4 to 10 carbon atoms or phenoxy groups or aryl groups having 6 to 20 carbon atoms or alkyl groups having 1 to 10 carbon atoms or alkenyl groups having 2 to 20 carbon atoms or aralkyl groups having 7 to 20 carbon atoms or halides and wherein X is a polar organic group containing urea and wherein m assumes the value 1 or 2 and wherein n is an integer from 1 to 8 and wherein $R^2$ is a hydrogen atom or an acyl group having 1 to 20 carbon atoms.

16 Claims, No Drawings

SULFUR-CROSSLINKABLE RUBBER MIXTURE AND VEHICLE TIRE

The invention relates to a sulfur-crosslinkable rubber mixture, particularly for treads of vehicle tires, and to a vehicle tire.

To a high degree, the rubber composition of the tread determines the running properties of a vehicle tire, particularly of a pneumatic vehicle tire. For the purposes of the present text, the term vehicle tires encompasses pneumatic vehicle tires, solid rubber tires and two-wheel tires.

The rubber mixtures which find use particularly in the parts of belts, hoses and cords that are subject to severe mechanical stress are substantially responsible for the stability and long life of these rubber articles. Therefore, very high demands are made on these rubber mixtures for vehicle tires, cords, belts and hoses.

There are trade-offs between most of the known tire properties, such as wet grip characteristics, dry braking, handling characteristics, rolling resistance, winter properties, abrasion characteristics and friction properties.

Particularly in the case of vehicle tires, various attempts have been made to positively influence the properties of the tire through the variation of the polymer components, the fillers and the other admixtures, particularly in the tread mixture.

In this context, it has to be taken into account that any improvement in one tire property often entails a deterioration in another property.

In a given blend system, for example, there exist various known ways of optimizing the handling characteristics by increasing the stiffness of the rubber mixtures. Mention should be made here, for example, of an increase in the filler level and the increase in the node density of the vulcanized rubber mixture. While an increased proportion of filler brings disadvantages in terms of rolling resistance, boosting the network leads to a deterioration in the tear properties and the wet grip indicators of the rubber mixture.

It is also known that rubber mixtures, especially for the tread of vehicle tires, may comprise silica as filler. It is additionally known that advantages with regard to the rolling resistance characteristics and processability of the rubber mixture arise when the silica has been attached to the polymer(s) by means of silane coupling agents. Silane coupling agents known in the prior art are disclosed, for example, by DE 2536674 C3 and DE 2255577 C3.

It is an object of the present invention to provide a rubber mixture having higher stiffness compared to the prior art, without any significant adverse effect on the indicators for the trade-off between rolling resistance and wet grip. In addition, the abrasion resistance of the rubber mixture is optionally to be improved.

This object is achieved by a rubber mixture comprising the following constituents:
at least one diene rubber, and
10 to 200 phr of at least one silica, and
2 to 20 phf of at least one silane having the general empirical formula $$[(R^1)_3Si-X]_mS_n(R^2)_{2-m}$$  I)

where the $R^1$ radicals may be the same or different within one molecule and are alkoxy groups having 1 to 10 carbon atoms or cyclic dialkoxy groups having 2 to 10 carbon atoms or cycloalkoxy groups having 4 to 10 carbon atoms or phenoxy groups or aryl groups having 6 to 20 carbon atoms or alkyl groups having 1 to 10 carbon atoms or alkenyl groups having 2 to 20 carbon atoms or aralkyl groups having 7 to 20 carbon atoms or halides, and where X is a polar organic urea-containing group, and where m assumes the value of 1 or 2, and where n is an integer from 1 to 8, and where $R^2$ is a hydrogen atom or an acyl group having 1 to 20 carbon atoms.

Surprisingly, the rubber mixture, compared to the prior art, exhibits higher stiffness with virtually equal indicators of rolling resistance and wet grip. Vehicle tires comprising the rubber mixture of the invention in the tread and/or other components exhibit optimized characteristics in relation to the trade-offs of handling, rolling resistance and wet grip.

In addition, the rubber mixture of the invention has shorter full vulcanization times compared to the prior art, which enables a cost saving in the production of vehicle tires, for example.

The expression phr (parts per hundred parts of rubber by weight) used in this text is the standard unit of amount for blend recipes in the rubber industry. The dosage of the parts by weight of the individual substances is based in this document on 100 parts by weight of the total mass of all high molecular weight and hence solid rubbers present in the mixture.

The expression phf (parts per hundred parts of filler by weight) used in this text is the conventional unit of amount for coupling agents for fillers in the rubber industry. For the purposes of the present patent application, phf relates to the silica present, meaning that any other fillers present, such as carbon black, are not included in the calculation of the amount of silane.

According to the invention, the rubber mixture comprises at least one diene rubber.

Diene rubbers refer to rubbers which arise through polymerization or copolymerization of dienes and/or cycloalkenes and hence have C=C double bonds either in the main chain or in the side groups.

The diene rubber is selected from the group consisting of natural polyisoprene and/or synthetic polyisoprene and/or epoxidized polyisoprene and/or butadiene rubber and/or butadiene-isoprene rubber and/or solution-polymerized styrene-butadiene rubber and/or emulsion-polymerized styrene-butadiene rubber and/or styrene-isoprene rubber and/or liquid rubbers having a molecular weight $M_w$ of greater than 20 000 g/mol and/or halobutyl rubber and/or polynorbornene and/or isoprene-isobutylene copolymer and/or ethylene-propylene-diene rubber and/or nitrile rubber and/or chloroprene rubber and/or acrylate rubber and/or fluoro rubber and/or silicone rubber and/or polysulfide rubber and/or epichlorohydrin rubber and/or styrene-isoprene-butadiene terpolymer and/or hydrogenated acrylonitrile-butadiene rubber and/or hydrogenated styrene-butadiene rubber.

Particularly nitrile rubber, hydrogenated acrylonitrile-butadiene rubber, chloroprene rubber, butyl rubber, halobutyl rubber or ethylene-propylene-diene rubber are used in the production of industrial rubber articles such as cords, belts and hoses, and/or shoe soles.

Preferably, the diene rubber is selected from the group consisting of natural polyisoprene and/or synthetic polyisoprene and/or butadiene rubber and/or solution-polymerized styrene-butadiene rubber and/or emulsion-polymerized styrene-butadiene rubber.

In a preferred development of the invention, at least two different diene rubber types are used in the rubber mixture.

In a preferred embodiment of the invention, the rubber mixture of the invention contains 5 to 40 phr, preferably 5 to 30 phr, of at least one natural polyisoprene and/or at least one synthetic polyisoprene and 25 to 85 phr of at least one styrene-butadiene rubber. This gives rise to good processability of the rubber mixture in combination with improved physical properties, such as stiffness in particular, with other properties such as rolling resistance and/or wet grip and/or abrasion resistance and tear properties at a very good level.

In a further preferred embodiment of the invention, the rubber mixture of the invention contains 5 to 30 phr of at least one natural polyisoprene and/or at least one synthetic polyisoprene and 25 to 80 phr of at least one styrene-butadiene rubber and 5 to 50 phr of at least one butadiene rubber. In this case, at least three rubbers are present in the rubber mixture of the invention, the sum of all the rubbers adding up to 100 phr.

This gives rise to good processability of the rubber mixture in combination with improved physical properties, such as stiffness in particular, with other properties such as rolling resistance and/or wet grip and/or abrasion resistance and/or tear properties at a very good level. Such a rubber mixture is especially suitable for treads of vehicle tires, especially of car tires.

In a further preferred embodiment of the invention, the rubber mixture of the invention contains 60 to 100 phr, preferably 80 to 100 phr, of at least one natural and/or synthetic polyisoprene and 0 to 40 phr, preferably 5 to 30 phr, more preferably 5 to 20 phr, of at least one butadiene rubber and 0 to 40 phr, preferably 5 to 30 phr, more preferably 5 to 20 phr, of at least one styrene-butadiene rubber.

This gives rise to good processability of the rubber mixture in combination with improved physical properties, such as stiffness in particular, with other properties such as rolling resistance and/or wet grip and/or abrasion resistance and/or tear properties at a very good level. Such a rubber mixture is especially suitable for treads of motor vehicle tires, especially of truck tires. In a preferred development of the invention, the rubber mixture in this case contains 60 to 100 phr of at least one natural and/or synthetic polyisoprene and 5 to 30 phr of at least one butadiene rubber and/or 5 to 30 phr of at least one styrene-butadiene rubber.

In a further preferred embodiment of the invention, the rubber mixture of the invention contains 0 to 30 phr, preferably 5 to 30 phr, of at least one butadiene rubber and 70 to 100 phr, preferably 70 to 95 phr, of at least one natural and/or synthetic polyisoprene. Such a rubber mixture, especially in internal components as in the form of belt rubberizing compound and/or carcass rubberizing compound, has good properties, for example in terms of processability and/or heat buildup (rolling resistance) and/or friction properties.

In a further preferred embodiment of the invention, the rubber mixture of the invention contains 50 to 80 phr of at least one butadiene rubber and 20 to 50 phr of at least one natural and/or synthetic polyisoprene. Such a rubber mixture, especially in external tire components such as the sidewall and/or the flange profile, has good properties, for example in terms of processability and/or heat buildup (rolling resistance) and/or friction properties and/or fatigue resistance.

The rubber mixture of the invention contains 10 to 200 phr, preferably 20 to 180 phr, more preferably 40 to 150 phr, even more preferably 40 to 110 phr and even more preferably again 80 to 110 phr of at least one silica.

The silicas may be silicas known to those skilled in the art that are suitable as filler for tire rubber mixtures. However, particular preference is given to using a finely divided, precipitated silica which has a nitrogen surface area (BET surface area) (in accordance with DIN ISO 9277 and DIN 66132) of 35 to 350 m²/g, preferably 35 to 260 m²/g, more preferably 100 to 260 m²/g and most preferably 130 to 235 m²/g, and a CTAB surface area (in accordance with ASTM D 3765) of 30 to 400 m²/g, preferably 30 to 255 m²/g, more preferably 100 to 255 m²/g and most preferably 110 to 230 m²/g. Such silicas, for example in rubber mixtures for tire treads, lead to particularly good physical properties of the vulcanizates. In addition, advantages can arise in processing of the mixture as a result of a reduction in the mixing time while maintaining the same product properties that lead to improved productivity. Silicas used may therefore, for example, be either those of the Ultrasil® VN3 type (trade name) from Evonik or highly dispersible silicas known as HD silicas (e.g. Zeosil® 1165 MP from Rhodia).

It is essential to the invention that the rubber mixture comprises a silane having the general empirical formula $$[(R^1)_3Si\text{---}X]_m S_n (R^2)_{2-m} \qquad \text{I)}$$

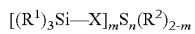

where the $R^1$ radicals may be the same or different within one molecule and are alkoxy groups having 1 to 10 carbon atoms or cyclic dialkoxy groups having 2 to 10 carbon atoms or cycloalkoxy groups having 4 to 10 carbon atoms or phenoxy groups or aryl groups having 6 to 20 carbon atoms or alkyl groups having 1 to 10 carbon atoms or alkenyl groups having 2 to 20 carbon atoms or aralkyl groups having 7 to 20 carbon atoms or halides, and where X is a polar organic urea-containing group, and where m assumes the value of 1 or 2, and where n is an integer from 1 to 8, and where $R^2$ is an acyl group having 1 to 20 carbon atoms or a hydrogen atom. Cyclic dialkoxy groups are derivatives of diols.

This silane of formula I), in the rubber mixture of the invention, serves a) as coupling agent for attachment of the silica present in the rubber mixture to the polymer chains of the diene rubber(s), and/or b) for surface modification of silica by attachment to the silica particles without attachment to the polymer chains.

Silane coupling agents are common knowledge and react with the surface silanol groups of the silica or other polar groups during the mixing of the rubber or rubber mixture (in situ) or in the manner of a pretreatment (premodification) actually before the addition of the filler to the rubber. Some silanes can additionally become attached to polymer chains of the rubber(s).

In the rubber mixture of the invention, the abovementioned silane wholly or partly replaces the silanes known in the prior art, such as TESPD (3,3'-bis(triethoxysilylpropyl) disulfide) or TESPT (3,3'-bis(triethoxysilylpropyl) tetrasulfide) or octyltriethoxysilanes (e.g. Si208®, from Evonik) or mercaptosilanes such as 3-mercaptopropyltriethoxysilane (e.g. Si263®, from Evonik), or blocked mercaptosilanes such as 3-octanoylthio-1-propyltriethoxysilane (e.g. NXT silane, from Momentive), with a simultaneous increase in stiffness without manifestation of the disadvantages with regard to rolling resistance and wet grip characteristics.

It is also conceivable in the context of the present invention that the abovementioned silane having the general empirical formula I) is used in combination with one or more silanes from the prior art.

The silane having the general empirical formula I) is present in the rubber mixture of the invention in amounts of 2 to 20 phf, preferably 2 to 15 phf, more preferably 5 to 15 phf. The expression phf (parts per hundred parts of filler by weight) used in this text is the conventional unit of amount for coupling agents for fillers in the rubber industry. For the purposes of the present patent application, phf relates to the silica present, meaning that any other fillers present, such as carbon black, are not included in the calculation of the amount of silane.

It is essential to the invention that the silane having the abovementioned empirical formula I) has a polar organic urea-containing X group. This polar urea-containing X group links the silicon atom(s) to a sulfur atom of the $S_n$ moiety. In the art, such a linking group is also called a spacer since it determines the distance between silicon (attachment to the filler) and sulfur (attachment to the diene rubber).

The organic spacers known in the prior art typically contain one or more propyl radicals (also called a propyl group), as customary, for example, in the above-detailed silanes TESPD and TESPT and mercaptosilanes and NXT silanes.

With the rubber mixture of the invention, it has been found that, using a silane having a polar urea-containing spacer X rather than a silane from the prior art, increased stiffness of the rubber mixture is achieved in combination with simultaneous shortening of the full vulcanization time.

In this context, "polar organic urea-containing X group" is understood to mean that this is an unbranched, branched or cyclic hydrocarbyl group having at least one polar organic urea functionality.

The heteroatoms of the at least one urea functionality, such as oxygen (O) and nitrogen (N), result in greater polarity within the molecule compared to hydrocarbyl radicals without heteroatoms, such as alkyl groups, which gives rise to the term "polar" in the context of the present invention. Hydrocarbyl radicals without heteroatoms are generally classified as nonpolar in the art.

The expression "polar" should be regarded as an additional description of the X group, the feature of "urea-containing" being essential to the invention.

The above description of the polar organic urea-containing functionalities should be understood such that the at least one urea functionality bound within the hydrocarbyl radical is in the form of a urea derivative as a result of the attachment to the hydrocarbyl radical, such that the polar organic group has at least one following polar functionality:

—(H)N—CO—N(H)—  II)

Thus, the group II) is joined directly or via R radicals (organic hydrocarbyl group as described below) to the $S_n$ group on one side, and directly or via R radicals (organic hydrocarbyl group as described below) to the silicon atom of the $(R^1)_3Si$— group on the other side. The R radicals may be the same or different on both sides.

In a preferred embodiment of the invention, the polar organic urea-containing X group has at least one urea derivative of formula II) as polar functionality which bears an organic hydrocarbyl group R having 1 to 30 carbon atoms, preferably 1 to 20 carbon atoms, more preferably 1 to 10 carbon atoms, even more preferably 1 to 7 carbon atoms, especially preferably 2 or 3 carbon atoms, on the two nitrogen atoms, where the group between one nitrogen of the urea-containing group and the sulfur of the $S_n$ group is aliphatic, preferably an alkyl group, and the group between the second nitrogen atom of the urea-containing group and the silicon atom of the $(R^1)_3Si$— group may be either aliphatic or aromatic. The R radicals may thus be the same or different on both sides.

In a further preferred embodiment of the invention, the polar organic urea-containing X group has at least one urea derivative of formula II) as polar functionality which bears an organic hydrocarbyl group on the two nitrogen atoms, where the group (organic hydrocarbyl group) between one nitrogen of the urea-containing group and the sulfur of the $S_n$ group is aliphatic, more preferably an alkyl group, and the group between the second nitrogen atom of the urea-containing group and the silicon atom of the $(R^1)_3Si$— group is aliphatic, more preferably an alkyl group.

More preferably, thus, the nitrogen atom and the silicon atom of the $(R^1)_3Si$— group are joined to one another via an alkyl group, and the other nitrogen atom and the sulfur atom of the $S_n$ group are likewise joined to one another via an alkyl group. In this case, the two groups may be the same alkyl radical or different alkyl radicals (e.g. different number of carbon atoms).

In this way, compared to the prior art, particularly high stiffnesses and tensile strengths and/or even improved abrasion properties of the rubber mixture are achieved. The state of the art here is JP2002201312A, in which agents having aromatic spacers containing a nitrogen-containing organic functionality are disclosed, these having lower stiffnesses and lower tensile strengths compared to other silanes.

According to Römpp's *Online Lexicon*, version 4.0, "aliphatic compounds" are "functionalized or unfunctionalized organic compounds containing no aromatic ring system".

In a preferred embodiment of the invention, X is a 1-ethyl-3-propylurea radical. In the context of the present invention, the propyl group is arranged here between the first nitrogen atom of the urea functionality and the silicon atom, and the ethyl group between the second nitrogen atom of the urea functionality and the sulfur atom of the $S_n$ group. This preferably applies to all embodiments of the present invention. However, for the achievement of the underlying technical object, it is also conceivable in principle that the ethyl and propyl radicals are arranged in an inverse manner, between urea and Si and between urea and sulfur atom respectively.

As well as at least one urea functionality as described above, the X group may be substituted by F—, Cl—, Br—, I—, CN— or HS— on the organic hydrocarbyl groups (R radicals) as described above.

The $R^1$ radicals bonded to the silicon atom are alkoxy groups having 1 to 10 carbon atoms, preferably methoxy or ethoxy groups, or cyclic dialkoxy groups having 2 to 10 carbon atoms or cycloalkoxy groups having 4 to 10 carbon atoms or phenoxy groups or aryl groups having 6 to 20 carbon atoms, preferably phenyl, or alkyl groups having 1 to 10 carbon atoms, preferably methyl or ethyl groups, or alkenyl groups having 2 to 20 carbon atoms or aralkyl groups having 7 to 20 carbon atoms or halides, preferably chlorides ($R^1$=Cl), and may be the same or different within one molecule.

It is also conceivable that a cyclic dialkoxy group (the derivative of a diol) is attached in such a way that it is bonded to the silicon atom by both oxygen atoms and hence counts as two attached $R^1$ radicals, where the further $R^1$ radical is selected from the abovementioned options. Preferably, $R^1$, however, is methoxy and/or ethoxy groups. More preferably, all three $R^1$ radicals are the same and are methoxy and/or ethoxy groups, and are most preferably three ethoxy groups.

The index m may assume the values of 1 or 2. Thus, the group $[(R^1)_3Si—X]$  III)

may occur once or twice per molecule. In the case that m=2, the sulfur is thus bonded to these two groups only, and so there is no $R^2$ radical in the molecule in this case. The two III) groups are then joined via the $S_n$ moiety with n=1 to 8, i.e. via a sulfur atom or a chain of 2 to 8 sulfur atoms.

Preferably, n is an integer from 1 to 6, more preferably from 1 to 4. This gives rise to particularly good properties with regard to stiffness and vulcanization characteristics, especially full vulcanization time. The sulfur content (value of n) is determined by means of $^1$H NMR.

If m=1, an $R^2$ radical is bonded to the sulfur atom furthest removed from the silyl group. $R^2$ is a hydrogen atom or an acyl group having 1 to 20 carbon atoms. If the $R^2$ radical is an acyl group, the carbon atom which bears the keto group, i.e. the double bond to the oxygen atom, is bonded to the sulfur atom furthest removed from the silyl group.

In a preferred embodiment, the acyl group is an acetyl radical, i.e. the —CO—CH$_3$ moiety. In the context of the present invention, silyl group is understood to mean the moiety

$(R^1)_3Si$—.                  IV)

Thus, the silane may either be a mercaptosilane or a protected mercaptosilane, also called blocked mercaptosilane.

In a preferred embodiment of the invention, the rubber mixture of the invention comprises a silane having the following structure:

$[(R^1)_3Si—X]_2S_n$                  V)

In the abovementioned empirical formula I), m is thus 2, and so the $S_n$ moiety is joined on either side to a moiety

$[(R^1)_3Si—X]$.                  III)

More preferably, the polar urea-containing X groups and the $R^1$ radicals on either side of the molecule are the same. In this case, $R^1$ is more preferably an ethoxy group which is then present a total of six times in the molecule. Preferably, X on either side is a 1-ethyl-3-propylurea radical.

In a preferred embodiment, m=2 and n is 2, such that a chain of two sulfur atoms is present, of which one sulfur atom is bonded to one of the ethyl groups of each of the two 1-ethyl-3-propylurea radicals.

The preferred silane thus has the following structure VI):

VI)

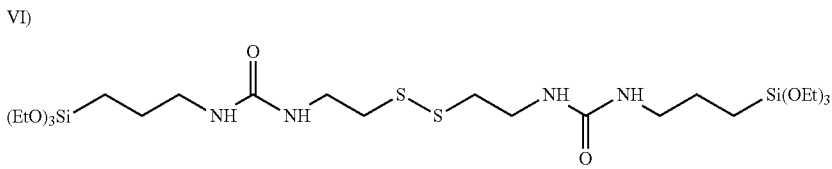

With this silane, particularly good stiffnesses are achieved without affecting the trade-off of rolling resistance versus wet grip. This silane can be obtained, for example, by reacting cystamine dihydrochloride with 3-isocyanatopropyltriethoxysilane in water with addition of at least one base, for example a 50% KOH solution (KOH=potassium hydroxide).

The silanes of the embodiments of formula I) described are analyzed by means of $^{13}$C NMR, $^1$H NMR and $^{29}$Si NMR.

In a further preferred embodiment, m=2 and n is an integer from 2 to 8, more preferably 3 or 4, where all the other radicals are preferably as detailed in formula VI). In this case, it is also possible for a mixture of silane molecules having different values of n to be present in the rubber mixture of the invention. For example, the rubber mixture may comprise a mixture of the silanes with n=2 and/or n=3 and n=4. Such a silane having 64 mol % of $S_4$ fraction (with <5 mol % of $S_x$, where x in this case is >4) and 36 mol % of $S_2$ fraction can be obtained, for example, by reaction of 3-aminopropyltriethoxysilane with 2-chloroethyl isocyanate in ethanol and subsequent reaction with sodium polysulfide (Na$_2$S$_4$).

In a further preferred embodiment of the invention, n=1 and m=2, such that a monosulfanesilane is present. All other radicals are preferably as detailed in formula VI), i.e. $R^1$=ethoxy (EtO) and X=1-ethyl-3-propylurea radical. This silane can be obtained by reacting 3-aminopropyltriethoxysilane with 2-chloroethyl isocyanate in ethanol and subsequent reaction with sodium sulfide (Na$_2$S). Surprisingly, an increase in stiffness combined with equal or even improved indicators of rolling resistance and wet grip is exhibited even with a monosulfane (with n=1 and m=2) compared to a silane that does not bind to polymers from the prior art. In addition, an improvement in abrasion resistance is observed.

In a further embodiment, the silane of formula I) is a mercaptosilane. In this case, m=1, and $R^2$=H, and n=1. Here too, X is preferably a 1-ethyl-3-propylurea radical, with the propyl group between the first nitrogen atom of the urea functionality and the silicon atom, and the ethyl group between the second nitrogen atom of the urea functionality and the sulfur atom. This silane can be obtained by reaction of NaSH in ethanol (by introduction of H$_2$S into a sodium ethoxide solution prepared from sodium and ethanol) with the halosilane (EtO)$_3$Si—CH$_2$CH$_2$CH$_2$—NH—CO—NH—CH$_2$CH$_2$—Cl in ethanol.

In a further embodiment, the silane of formula I) is a blocked mercaptosilane. In this case, m=1, and $R^2$=an acyl group having 1 to 20 carbon atoms (alkanoyl radical), preferably an acetyl radical (—CO—CH$_3$), and n=1. Here too, X is preferably a 1-ethyl-3-propylurea radical, with the propyl group between the first nitrogen atom of the urea functionality and the silicon atom, and the ethyl group between the second nitrogen atom of the urea functionality and the sulfur atom. This silane can be obtained by reacting 3-aminopropyltriethoxysilane with 2-chloroethyl isocyanate in ethanol and subsequent reaction with potassium thioacetate.

The rubber mixture of the invention may, as well as silica, also comprise further known polar and/or nonpolar fillers, for example carbon black.

If the rubber mixture of the invention comprises carbon black, preference is given to using a carbon black having an iodine absorption number to ASTM D 1510 of 30 g/kg to 250 g/kg, preferably 30 to 180 g/kg, more preferably 40 to 180 g/kg and most preferably 40 to 130 g/kg, and a DBP number to ASTM D 2414 of 60 to 200 mL/100 g, preferably 70 to 200 mL/100 g, more preferably 90 to 150 mL/100 g.

The amount of carbon black in the rubber mixture of the invention is preferably 0 to 50 phr, more preferably 0 to 20 phr and most preferably 0 to 7 phr, but in a preferred embodiment at least 0.1 phr. In a further preferred embodiment of the invention, the rubber mixture contains 0 to 0.5 phr of carbon black.

It is additionally conceivable for the rubber mixture to comprise carbon nanotubes (CNT) including discrete CNTs, known as hollow carbon fibers (HCF), and modified CNTs containing one or more functional groups such as hydroxyl, carboxyl and carbonyl groups). Graphite and graphenes, and also "carbon-silica dual-phase filler", are also conceivable as filler.

The rubber mixture may also comprise other polar fillers, for example aluminosilicates, chalk, starch, magnesium oxide, titanium dioxide or rubber gels.

It is possible for 0 to 100 phr, preferably 0.1 to 80 phr, more preferably 0.1 to 70 phr and most preferably 0.1 to 50 phr of at least one plasticizer to be present in the rubber mixture. Such plasticizers include all plasticizers known to those skilled in the art, such as aromatic, naphthenic or paraffinic mineral oil plasticizers, for example MES (mild extraction solvate) or TDAE (treated distillate aromatic extract), or rubber-to-liquid oils (RTL) or biomass-to-liquid oils (BTL) or factices or plasticizer resins or liquid polymers (such as liquid BR), the average molecular weight of which (determined by GPC=gel permeation chromatography, using a method based on BS ISO 11344:2004) is in the range from 500 to 20 000 g/mol. If liquid polymers are used as plasticizers in the rubber mixture of the invention, these are not counted as rubber in the calculation of the composition of the polymer matrix.

The plasticizer is preferably selected from the group consisting of the abovementioned plasticizers. Mineral oils are particularly preferred as plasticizer. When mineral oil is used, it is preferably selected from the group consisting of DAE (distilled aromatic extracts) and/or RAE (residual aromatic extracts) and/or TDAE (treated distilled aromatic extracts) and/or MES (mild extracted solvents) and/or naphthenic oils.

Furthermore, the rubber mixture of the invention may comprise standard additives in customary proportions by weight. These additives include: a) aging inhibitors, for example N-phenyl-N'-(1,3-dimethylbutyl)-p-phenylenediamine (6PPD), N,N'-diphenyl-p-phenylenediamine (DPPD), N,N'-ditolyl-p-phenylenediamine (DTPD), N-isopropyl-N'-phenyl-p-phenylenediamine (IPPD), 2,2,4-trimethyl-1,2-dihydroquinoline (TMQ); b) activators, for example zinc oxide and fatty acids (e.g. stearic acid); c) waxes; d) resins, especially tackifying resins, which are not plasticizer resins; e) masticating aids, for example 2,2'-dibenzamidodiphenyl disulfide (DBD); and f) processing aids, for example fatty acid salts, for example zinc soaps, and fatty acid esters and derivatives thereof.

Particularly when the rubber mixture of the invention is used for the internal components of a tire or an industrial rubber article which come into direct contact with strengthening elements present, a suitable bonding system, often in the form of tackifying resins, is generally also added to the rubber mixture.

The proportion by weight of the total amount of further additives is from 3 to 150 phr, preferably from 3 to 100 phr and particularly preferably from 5 to 80 phr.

The total proportion of the further additives includes 0.1 to 10 phr, preferably 0.2 to 8 phr, more preferably 0.2 to 4 phr, of zinc oxide (ZnO).

All types of zinc oxide known to those skilled in the art, for example ZnO granulates or powders, are possible here. The zinc oxide conventionally used generally has a BET surface area of less than 10 m²/g. However, it is also possible to use what is called nano-zinc oxide having a BET surface area of 10 to 60 m²/g.

It is customary to add zinc oxide as activator, usually in combination with fatty acids (e.g. stearic acid), to a rubber mixture for sulfur crosslinking with vulcanization accelerators. The sulfur is then activated by complex formation for the vulcanization.

The vulcanization is conducted in the presence of sulfur or sulfur donors with the aid of vulcanization accelerators, it being possible for some vulcanization accelerators to act simultaneously as sulfur donors. Sulfur or sulfur donors and one or more accelerators are added in the stated amounts to the rubber mixture in the last mixing step. The accelerator is selected from the group consisting of thiazole accelerators and/or mercapto accelerators and/or sulfenamide accelerators and/or thiocarbamate accelerators and/or thiuram accelerators and/or thiophosphate accelerators and/or thiourea accelerators and/or xanthogenate accelerators and/or guanidine accelerators.

Preference is given to using a sulfenamide accelerator selected from the group consisting of N-cyclohexyl-2-benzothiazolesulfenamide (CBS) and/or N,N-dicyclohexylbenzothiazole-2-sulfenamide (DCBS) and/or benzothiazyl-2-sulfenomorpholide (MBS) and/or N-tert-butyl-2-benzothiazylsulfenamide (TBBS).

Sulfur-donating substances used may be any of the sulfur-donating substances known to those skilled in the art. If the rubber mixture comprises a sulfur-donating substance, it is preferably selected from the group comprising, for example, thiuram disulfides, for example tetrabenzylthiuram disulfide (TBzTD) and/or tetramethylthiuram disulfide (TMTD) and/or tetraethylthiuram disulfide (TETD), and/or thiuram tetrasulfides, for example dipentamethylenethiuram tetrasulfide (DPTT), and/or dithiophosphates, for example DipDis (bis(diisopropyl)thiophosphoryl disulfide) and/or bis(O,O-2-ethylhexylthiophosphoryl) polysulfide (e.g. Rhenocure SDT 50®, Rheinchemie GmbH) and/or zinc dichloryldithiophosphate (e.g. Rhenocure ZDT/S®, Rheinchemie GmbH) and/or zinc alkyldithiophosphate, and/or 1,6-bis(N, N-dibenzylthiocarbamoyldithio)hexane and/or diaryl polysulfides and/or dialkyl polysulfides.

Further network-forming systems as obtainable, for example, under the Vulkuren®, Duralink® or Perkalink® trade names or network-forming systems as described in WO 2010/049216 A2 can also be used in the rubber mixture. This system comprises a vulcanizing agent which crosslinks with a functionality of greater than four and at least one vulcanization accelerator. The vulcanizing agent which crosslinks with a functionality of greater than four has, for example, the general formula A):

$$G[C_aH_{2a}-CH_2-S_bY]_c \qquad A)$$

where G is a polyvalent cyclic hydrocarbon group and/or a polyvalent heterohydrocarbon group and/or a polyvalent siloxane group containing 1 to 100 atoms; where each Y is selected independently from a rubber-active group containing sulfur-containing functionalities; and where a, b and c are integers with, independently, a=0 to 6; b=0 to 8; and c=3 to 5.

The rubber-active group is preferably selected from a thiosulfonate group, a dithiocarbamate group, a thiocarbonyl group, a mercapto group, a hydrocarbon group and a sodium thiosulfonate group (Bunte salt group). Very good abrasion and tear properties of the rubber mixture of the invention are achieved in this way.

For the purposes of the present invention, sulfur and sulfur donors, including sulfur-donating silanes such as TESPT, and vulcanization accelerators as described above and vulcanizing agents which crosslink with a functionality of greater than four, as described in WO 2010/049216 A2, for example a vulcanizing agent of the formula A), and also the abovementioned Vulkuren®, Duralink® and Perkalink® systems are covered by the term "vulcanizing agent".

The rubber mixture of the invention preferably comprises at least one vulcanizing agent selected from the group comprising sulfur and/or sulfur donors and/or vulcanization accelerators and/or vulcanizing agents which crosslink with a functionality greater than four. In this way, it is possible to produce vulcanizates from the rubber mixture of the invention, especially for use in vehicle tires.

In a further development of the invention, two or more accelerators are present in the rubber mixture. Particular preference is given to the use of the accelerators TBBS and/or CBS and/or diphenylguanidine (DPG).

The rubber mixture of the invention is produced by processes which are customary in the rubber industry and in which a base mixture comprising all constituents apart from the vulcanization system (sulfur and vulcanization-influencing substances) is firstly produced in one or more mixing stages. The finished mixture is produced by adding the vulcanization system in a final mixing stage. The finished mixture is processed further, for example, by an extrusion operation and converted to the appropriate shape.

Preferably, the rubber mixture of the invention is used in the tread of vehicle tires. As the person skilled in the art is aware, the tread contributes to a high degree to the handling characteristics of vehicle tires. More preferably, the vehicle tire is a pneumatic vehicle tire. The rubber mixture of the invention is alternatively suitable for other components of vehicle tires such as the sidewall and/or the flange profile and/or internal components, called the body components, for example as carcass rubberizing compound and/or belt rubberizing compound.

It is a further object of the present invention to provide a vehicle tire which features improved handling characteristics without affecting the trade-off of rolling resistance versus wet grip properties. This object is achieved by virtue of the vehicle tire comprising the rubber mixture of the invention as described above in at least one component. In this case, all the details given above relating to the constituents and their features are applicable.

Preferably, the component is a tread. As the person skilled in the art is aware, the tread contributes to a high degree to the handling characteristics of vehicle tires. More preferably, the vehicle tire is a pneumatic vehicle tire.

The rubber mixture of the invention is alternatively suitable for other components of vehicle tires such as the sidewall and/or internal components, called the body components. It is a further object of the present invention to improve the handling characteristics without affecting the trade-off of rolling resistance versus wet grip properties of vehicle tires. This object is achieved in accordance with the invention by the use of the above-described rubber mixture with all the abovementioned embodiments and features in vehicle tires.

The rubber mixture is additionally suitable for production of industrial rubber articles, for example conveyor belts, other belts, cords, hoses, printing blankets, air springs or damping elements, or shoe soles.

The invention will now be illustrated with the aid of comparative examples and working examples which are summarized in tables 1 to 4. The comparative mixtures are identified by C, the inventive mixtures by I.

The mixtures were produced by the method customary in the rubber industry under standard conditions in two stages in a laboratory mixer of capacity 300 milliliters to 3 liters, in which, in the first mixing stage (base mixing stage), all constituents apart from the vulcanization system (sulfur and vulcanization-influencing substances) were first mixed at 145 to 165° C., with target temperatures of 152 to 157° C., for 200 to 600 seconds. By adding the vulcanization system in the second stage (final mixing stage), the final mixture was produced, with mixing at 90 to 120° C. for 180 to 300 seconds.

The general method for production of rubber mixtures and vulcanizates thereof is described in "Rubber Technology Handbook", W. Hofmann, Hanser Verlag 1994.

All the mixtures were used to produce test specimens by vulcanization to $t_{95}$ (measured on a moving disk rheometer to ASTM D 5289-12/ISO 6502) under pressure at 160° C., and these test specimens were used to determine material properties that are typical in the rubber industry by the test methods specified hereinafter.

conversion time of 90% conversion ($t_{90}$, full vulcanization time) by means of rotorless vulcameter (MDR=moving disk rheometer) in accordance with ASTM D 5289-12/ISO 6502

Shore A hardness at room temperature (RT) in accordance with DIN ISO 7619-1

Rebound resilience at RT and 70° C. in accordance with DIN 53 512

Dynamic storage modulus E' at 55° C. in accordance with ISO 4664-1 at 0.15% elongation and at 8% elongation Maximum loss factor tan d (max), synonymous with tan δ (max), at 55° C. from dynamic-mechanical measurement in accordance with ISO 4664-1

Abrasion at room temperature in accordance with DIN 53 516 or DIN/ISO 4649

Tensile strength and stress value at 100% (100 modulus) and 300% static elongation (300 modulus) at room temperature in accordance with DIN 53 504

Substances Used a) BR: polybutadiene, high-cis Nd—BR, unfunctionalized, $T_g$=−105° C., BUNA® CB25, from Lanxess b) SSBR: Sprintan® SLR-4601, from Styron c) Silica: ULTRASIL® VN3, from Evonik d) Silane with 75% by weight $S_2$ content, Si261®, from Evonik e) Silane of structure VI) with polar organic urea-containing spacer:

VI)

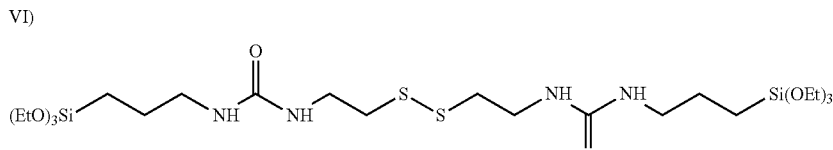

In this case, according to formula VI): n=2; $R^1$=(EtO); X=1-ethyl-3-propylurea; m=2; prepared by method E) specified below.

f) Accelerator: DPG (diphenylguanidine) and CBS (N-cyclohexyl-2-benzothiazolesulfenamide)

g) Si263® silane, from Evonik; mercaptosilane from the prior art: 3-mercaptopropyltriethoxysilane h) Silane of formula I) with n=1; $R^1$=(EtO); X=1-ethyl-3-propylurea; m=1;
$R^2$=H (mercaptosilane); prepared by method H) specified below. 88% purity in a mixture with $S_1$ silane as per silane $^n)$ (see below, n=1; $R^1$=(EtO); X=1-ethyl-3-propylurea; m=2) and $S_2$ silane as per silane $^e)$ (see above, n=2; $R^1$=(EtO); X=1-ethyl-3-propylurea; m=2); ratio of SH to $S_1$ to $S_2$=88:7:5 by $^{13}$C NMR (CDCl$_3$) analysis i) NXT silane, from Momentive Performance Materials Inc.; blocked mercaptosilane from the prior art; 3-octanoyl-thio-1-propyltriethoxysilane j) Silane of formula I) with n=1; $R^1$=(EtO); X=1-ethyl-3-propylurea; m=1; $R^2$=acetyl; S-(4,4-diethoxy-9-oxo-3-oxa-8,10-diaza-4-siladodecan-12-yl)ethanethioate (blocked mercaptosilane); prepared by method J) specified below; 87% purity by $^1$H NMR (CDCl$_3$) analysis: average integral value of —CH$_2$NH— versus total integral value of Si—CH$_2$ k) Polysulfanesilane from the prior art, Si69®, from Evonik l) Silane of formula I) with n=4; $R^1$=(EtO); X=1-ethyl-3-propylurea; m=2 (polysulfanesilane); prepared by method L) specified below; the amount specified in the table relates to the following mixture: 64 mol % of $S_4$ fraction (of which <5 mol % is $S_x$ where x is >4) and 36 mol % of $S_2$ fraction (silane $^e$) of formula VI, see above)

m) Octyl Si208® silane, from Evonik, prior art silane without any sulfur atoms, octyltriethoxysilane n) Silane of formula I) with n=1; $R^1$=(EtO); X=1-ethyl-3-propylurea; m=2; prepared by method N) specified below; 87% purity by $^1$H NMR (CDCl$_3$) analysis: average integral value of —CH$_2$NH— versus total integral value of Si—CH$_2$ o) BR: polybutadiene: Europrene Neocis BR 40, from Polimeri p) NR TSR: SIR 20 SED, from Aneka Bumi Pratama (TSR=Technically Specified Rubber; SIR=Standard Indonesian Rubber)

Preparation of the Silanes

E) Preparation of the silane e) [(EtO)$_3$Si—(CH$_2$)$_3$—NH—C(=O)—NH—(CH$_2$)$_2$—S—]$_2$ in water (without hexane wash):

An N$_2$-purged jacketed 1 L four-neck flask having a precision glass stirrer, reflux condenser, internal thermometer and dropping funnel is initially charged with cystamine dihydrochloride (108.39 g, 0.47 mol, 1.00 eq), which is dissolved in demineralized water (382 mL). By means of a dropping funnel, 50% KOH solution (92.31 g, 0.82 mol, 1.75 eq) is metered in at 15-23° C. and the mixture is stirred for 30 min. Then 3-isocyanatopropyltriethoxysilane (221.05 g, 0.85 mol, 1.8 eq) is metered in at such a rate that an internal temperature of 30° C. is not exceeded. Thereafter, the mixture is stirred at 24° C. for one hour. The white suspension is filtered under pressure, rinsed with three portions of demineralized water (totaling 340 mL) and dried with dry N$_2$ for 2 h. The filtercake is dried in an N$_2$ stream in a rotary evaporator at 35° C. and 166 mbar for 7 h, at 35° C. and 150 mbar for 10 h and at 35° C. and 100 mbar for 9 h.

The product [(EtO)$_3$Si—(CH$_2$)$_3$—NH—C(=O)—NH—(CH$_2$)$_2$—S]$_2$ is a fine white powder (246.38 g, 90.7% of theory; theory corresponds to the maximum possible yield).

$^1$H NMR ($\delta_{ppm}$, 500 MHz, DMSO-d6): 0.52 (4H, t), 1.14 (18H, t), 1.42 (4H, m), 2.74 (4H, m), 2.96 (4H, m), 3.29 (4H, m), 3.74 (12H, q), 6.05 (4H, m);

$^{13}$C NMR ($\delta_{ppm}$, 125 MHz, DMSO-d6): 7.3 (2C), 18.2 (6C), 23.5 (2C), 38.5 (2C), 39.6 (2C), 42.0 (2C), 57.7 (6C) 157.9 (2C).

$^{29}$Si NMR ($\delta_{ppm}$, 100 MHz, DMSO-d6): −45.3 (100% silane);

Soluble fractions in d6-DMSO using internal TPPO standard: 86.0%;

Water content (DIN 51777): 0.7%;

Initial melting point: 97° C.;

Residual isocyanate content: 0.08%

H) Preparation of the silane h) (EtO)$_3$Si—CH$_2$CH$_2$CH$_2$—NH—CO—NH—CH$_2$CH$_2$—SH from (EtO)$_3$Si—CH$_2$CH$_2$CH$_2$—NH—CO—NH—CH$_2$CH$_2$—Cl and NaSH Into a solution of NaSH in ethanol [prepared by introduction of H$_2$S (15.21 g, 0.45 mol, 1.07 eq) into a sodium ethoxide solution (prepared from Na (10.55 g, 0.46 mol, 1.10 eq) in EtOH (300 mL))] is metered, at 52° C., (EtO)$_3$Si—CH$_2$CH$_2$CH$_2$—NH—CO—NH—CH$_2$CH$_2$—Cl (138.90 g, 0.42 mol, 1.00 eq) in ethanol (300 mL), and the mixture is heated to 78° C. After a reaction time of 5 h, the mixture is cooled to room temperature and the suspension is filtered. The filtrate is freed of the solvent on a rotary evaporator and dried under reduced pressure. The (EtO)$_3$Si—CH$_2$CH$_2$CH$_2$—NH—CO—NH—CH$_2$CH$_2$—SH product (134.96 g, 97.9% of theory) is obtained as a white solid.

$^1$H NMR ($\delta_{ppm}$, 500 MHz, CDCl$_3$): 0.64 (2H, t), 1.23 (9H, t), 1.36 (1H, br), 1.61 (2H, m), 2.67 (2H, t), 3.17 (2H, m), 3.37 (2H, m), 3.81 (6H, q), 4.74 (1H, br), 4.94 (1H, br);

$^{13}$C NMR ($\delta_{ppm}$, 125 MHz, CDCl$_3$): 7.8 (1C), 18.3 (3C), 23.8 (1C), 25.6 (1C), 43.0 (1C), 43.5 (1C), 58.4 (3C), 158.9 (1C).

J) Preparation of the silane j) (EtO)$_3$Si—CH$_2$CH$_2$CH$_2$—NH—CO—NH—CH$_2$CH$_2$—S—CO—CH$_3$ from (EtO)$_3$Si—CH$_2$CH$_2$CH$_2$—NH$_2$, OCN—CH$_2$CH$_2$—Cl and KSAc:

3-Aminopropyltriethoxysilane (132.82 g, 0.60 mol, 1.00 eq) is initially charged in ethanol (300 mL) in a three-neck flask having a precision glass stirrer, internal thermometer, dropping funnel and reflux condenser, and cooled down to −78° C. 2-Chloroethyl isocyanate (63.34 g, 0.60 mol, 1.00 eq) is added dropwise at −78 to −68° C. within 1.75 h and then the mixture is heated to 50° C. Potassium thioacetate (68.53 g, 0.60 mol, 1.00 eq) is added in five portions and the mixture is heated to reflux. After a reaction time of 2.25 h, the mixture is cooled to room temperature and the suspension is filtered. The filtrate is freed of the solvent on a rotary evaporator and dried under reduced pressure. The (EtO)$_3$Si—CH$_2$CH$_2$CH$_2$—NH—CO—NH—CH$_2$CH$_2$—S—CH$_3$ product (213.91 g, 97.3% of theory; theory corresponds to maximum possible yield) is obtained as a waxy white solid.

$^1$H NMR ($\delta_{ppm}$, 500 MHz, CDCl$_3$): 0.64 (2H, t), 1.22 (9H, t), 1.62 (2H, m), 2.35 (3H, s), 3.01 (2H, t), 3.16 (2H, t), 3.34 (2H, t), 3.82 (6H, q), 4.7-5.0 (2H, br);

$^{13}$C NMR ($\delta_{ppm}$, 125 MHz, CDCl$_3$): 7.8 (1C), 18.3 (3C), 23.8 (1C), 29.9 (1C), 30.6 (1C), 40.1 (1C), 43.0 (1C), 58.4 (3C), 158.7 (1C), 195.9 (1C).

L) Preparation of the silane 1) (EtO)$_3$Si—CH$_2$CH$_2$CH$_2$—NH—CO—NH—CH$_2$CH$_2$—S$_4$—CH$_2$CH$_2$—NH—CO—NH—CH$_2$CH$_2$CH$_2$—Si(OEt)$_3$ from (EtO)$_3$Si—CH$_2$CH$_2$CH$_2$—NH$_2$, OCN—CH$_2$CH$_2$—Cl and Na$_2$S$_4$:

In a first reaction step, 3-aminopropyltriethoxysilane (154.95 g, 0.70 mol, 1.00 eq) is initially charged in ethanol (3.0 L) in a 4 L three-neck flask having a precision glass stirrer, internal thermometer, dropping funnel and reflux condenser, and cooled down to −78° C. 2-Chloroethyl isocyanate (73.86 g, 0.70 mol, 1.00 eq) is added dropwise at −78 to −60° C. within 1 h, in the course of which a voluminous salt precipitates out. Thereafter, the mixture is heated to 50° C., sodium polysulfide (Na$_2$S$_4$, 57.62 g, 0.35 mol, 1.00 eq) which has been crushed with a mortar and pestle is added in portions, and the mixture is heated to reflux. After a reaction time of 4.5 h, the mixture is cooled to room temperature and the suspension is filtered. The filtrate is freed of the solvent on a rotary evaporator and dried under reduced pressure. The (EtO)$_3$Si—CH$_2$CH$_2$CH$_2$—NH—CO—NH—CH$_2$CH$_2$—S$_4$—CH$_2$CH$_2$—NH—CO—NH—CH$_2$CH$_2$CH$_2$—Si(OEt)$_3$ product (155.05 g, 63.1% of theory) is obtained as an orange solid.

$^1$H NMR ($\delta_{ppm}$, 500 MHz, d6-Tol): 0.7 (4H, t), 1.21 (18H, t), 1.75 (4H, m), 2.65 (4H·2S fraction, t), 2.89 (4H·S4 fraction, t), 3.25-3.35 (4H, 2S/4S, m), 3.40-3.60 (4H, 2S/4S, m), 3.81 (12H, q), 5.5-6.0 (4H, br);

S$_4$ fraction in the product mixture (contains S$_x$ fraction of about <5%): 64.0 mol %

S$_2$ fraction in the product mixture: 36.0 mol %;

Initial melting point: 78-91° C.

N) Preparation of the silane n) (EtO)$_3$Si—CH$_2$CH$_2$CH$_2$—NH—CO—NH—CH$_2$CH$_2$—S—CH$_2$CH$_2$—NH—CO—NH—CH$_2$CH$_2$CH$_2$—Si(OEt)$_3$ from (EtO)$_3$Si—CH$_2$CH$_2$CH$_2$—NH$_2$, OCN—CH$_2$CH$_2$—Cl and Na$_2$S:

In a first reaction step, 3-aminopropyltriethoxysilane (159.39 g, 0.72 mol, 1.00 eq) is initially charged in ethanol (3.0 L) in a 4 L three-neck flask having a precision glass stirrer, internal thermometer, dropping funnel and reflux condenser, and cooled down to −78° C. 2-Chloroethyl isocyanate (75.92 g, 0.72 mol, 1.00 eq) is added dropwise at −78 to −69° C. within 2.25 h and then the mixture is heated to 50° C. Dry sodium sulfide (Na$_2$S, 28.09 g, 0.36 mol, 0.50 eq) is added in five portions, and the mixture is heated to reflux. After a reaction time of 4.5 h, the mixture is cooled to room temperature and the suspension is filtered. The filtrate is freed of the solvent on a rotary evaporator and dried under reduced pressure. The (EtO)$_3$Si—CH$_2$CH$_2$CH$_2$—NH—CO—NH—CH$_2$CH$_2$—S—CH$_2$CH$_2$—NH—CO—NH—CH$_2$CH$_2$CH$_2$—Si(OEt)$_3$ product (214.09 g, 96.7% of theory) is obtained as a waxy white solid.

$^1$H NMR ($\delta_{ppm}$, 500 MHz, CDCl$_3$): 0.64 (4H, t), 1.22 (18H, t), 1.61 (4H, m), 2.67 (4H, t), 3.15 (4H, m), 3.40 (4H, m), 3.82 (12H, q), 5.16 (2H, br), 5.43 (2H, br);

$^{13}$C NMR ($\delta_{ppm}$, 125 MHz, CDCl$_3$): 7.8 (2C), 18.3 (6C), 23.8 (2C), 33.0 (2C), 40.3 (2C), 42.9 (2C), 58.4 (6C), 159.3 (2C).

TABLE 1

| | Unit | C1 | I1 | I2 | C2 | I3 |
|---|---|---|---|---|---|---|
| Constituents | | | | | | |
| NR TSR [p] | phr | 20 | 20 | 20 | 30 | 30 |
| BR [a] | phr | 44 | 44 | 44 | — | — |
| SSBR [b] | phr | 36 | 36 | 36 | 70 | 70 |
| Silica [c] | phr | 95 | 95 | 95 | 86 | 86 |
| Silane [d] | phf | 7.2 | — | — | 7.2 | — |
| Silane [e] | phf | — | 9.8 | 11.2 | — | 9.8 |
| N339 carbon black | phr | — | — | — | 5 | 5 |
| Plasticizer | phr | 45 | 45 | 45 | 24 | 24 |
| Aging stabilizer | phr | 4 | 4 | 4 | 4 | 4 |
| Processing aid | phr | — | — | — | 4 | 4 |
| Stearic acid | phr | 2.5 | 2.5 | 2.5 | 1 | 1 |
| ZnO | phr | 2.5 | 2.5 | 2.5 | 2 | 2 |
| Accelerator [f] | phr | 3.6 | 3.6 | 3.6 | 4 | 4 |
| Sulfur | phr | 2 | 2 | 2 | 1.7 | 1.7 |
| Physical properties | | | | | | |
| t$_{90}$ | min | 14 | 10 | 6 | 12 | 5 |
| Shore hardness at RT | Shore A | 66 | 73 | 76 | 69 | 78 |
| Rebound resilience at RT | % | 31 | 32 | 33 | 24 | 25 |
| Rebound resilience at 70° C. | % | 40 | 39 | 42 | 42 | 42 |
| Tensile strength | MPa | 13 | 13 | 15 | 15 | 17 |
| 100 modulus | MPa | 1.9 | 2.6 | 3.0 | 1.9 | 2.9 |
| 300 modulus | MPa | 5.9 | 8.0 | 9.2 | 6.8 | 10.2 |
| E' (0.15%) | MPa | 11.2 | 18.0 | 19.2 | 14.0 | 19.7 |
| E' (8%) | MPa | 4.6 | 7.5 | 8.2 | 5.1 | 6.9 |
| Tan δ (max) at 55° C. | | 0.222 | 0.214 | 0.207 | 0.234 | 0.226 |

TABLE 2

| | Unit | C3 | C4 | I4 | I5 | C5 | I6 |
|---|---|---|---|---|---|---|---|
| Constituents | | | | | | | |
| NR TSR [p] | phr | 10 | 10 | 10 | 10 | 10 | 10 |
| BR [o] | phr | 18 | 18 | 18 | 18 | 18 | 18 |
| SSBR [b] | phr | 72 | 72 | 72 | 72 | 72 | 72 |
| Silica [c] | phr | 95 | 95 | 95 | 95 | 95 | 95 |
| Mercaptosilane [g] | phf | 6.1 | 9.4 | — | — | — | — |
| Mercaptosilane [h] | phf | — | — | 8.4 | 12.8 | — | — |
| Blocked mercaptosilane [i] | phf | — | — | — | — | 13.3 | — |
| Blocked mercaptosilane [j] | phf | — | — | — | — | — | 15.0 |
| TDAE plasticizer | phr | 50 | 50 | 50 | 50 | 50 | 50 |
| Aging stabilizer | phr | 4 | 4 | 4 | 4 | 4 | 4 |
| Stearic acid | phr | 2.5 | 2.5 | 2.5 | 2.5 | 2.5 | 2.5 |
| ZnO | phr | 2.5 | 2.5 | 2.5 | 2.5 | 2.5 | 2.5 |
| Accelerator [f] | phr | 4 | 4 | 4 | 4 | 4 | 4 |
| Sulfur | phr | 2 | 2 | 2 | 2 | 2 | 2 |
| Physical properties | | | | | | | |
| t$_{90}$ | min | 12 | 12 | 13 | 12 | 12 | 4 |
| Shore hardness at RT | Shore A | 65 | 63 | 67 | 64 | 63 | 73 |
| Rebound resilience at RT | % | 27 | 28 | 27 | 29 | 30 | 26 |
| Rebound resilience at 70° C. | % | 45 | 48 | 48 | 48 | 50 | 42 |
| Tensile strength | MPa | 11 | 10 | 12 | 11 | 10 | 13 |
| 100 modulus | MPa | 2.2 | 2.4 | 2.7 | 2.7 | 2.3 | 2.6 |
| 300 modulus | MPa | 7.2 | 8.1 | 8.6 | 8.6 | 6.2 | 6.9 |
| E' (0.15%) | MPa | 9.2 | 8.6 | 10.8 | 10.1 | 8.6 | 16.5 |
| E' (8%) | MPa | 5.6 | 5.6 | 6.0 | 6.0 | 4.9 | 7.1 |

TABLE 3

| | Unit | C7 | C8 | I8 | I9 |
|---|---|---|---|---|---|
| Constituents | | | | | |
| NR TSR [p] | phr | 10 | 10 | 10 | 10 |
| BR [o] | phr | 18 | 18 | 18 | 18 |
| SSBR [b] | phr | 72 | 72 | 72 | 72 |
| Silica [c] | phr | 95 | 95 | 95 | 95 |
| Polysulfanesilane [k] | phf | 8.0 | 9.88 | — | — |
| Polysulfanesilane [l] | phf | — | — | 10.4 | 12.71 |
| TDAE plasticizer | phr | 50 | 50 | 50 | 50 |
| Aging stabilizer | phr | 4 | 4 | 4 | 4 |
| Stearic acid | phr | 2.5 | 2.5 | 2.5 | 2.5 |
| ZnO | phr | 2.5 | 2.5 | 2.5 | 2.5 |
| Accelerator [j] | phr | 4 | 4 | 4 | 4 |
| Sulfur | phr | 2 | 2 | 2 | 2 |
| Physical properties | | | | | |
| $t_{90}$ | min | 18 | 15 | 12 | 9 |
| Shore hardness at RT | Shore A | 65 | 70 | 67 | 72 |
| Rebound resilience at RT | % | 27 | 28 | 27 | 27 |
| Rebound resilience at 70° C. | % | 50 | 53 | 50 | 51 |
| Tensile strength | MPa | 14 | 14 | 14 | 14 |
| 100 modulus | MPa | 2.4 | 3.2 | 2.8 | 3.3 |
| 300 modulus | MPa | 8.9 | 10.2 | 9.6 | 10.8 |
| E' (0.15%) | MPa | 7.7 | 10.5 | 11.3 | 12.8 |
| E' (8%) | MPa | 4.7 | 6.3 | 6.0 | 6.9 |

TABLE 4

| | Unit | C9 | C10 | I10 | I11 |
|---|---|---|---|---|---|
| Constituents | | | | | |
| NR TSR [p] | phr | 10 | 10 | 10 | 10 |
| BR [o] | phr | 18 | 18 | 18 | 18 |
| SSBR [b] | phr | 72 | 72 | 72 | 72 |
| Silica [c] | Phr | 95 | 95 | 95 | 95 |
| Silane without S [m] | phf | 6.1 | 9.4 | — | — |
| Monosulfanesilane [n] | phf | — | — | 7.9 | 12.1 |
| TDAE plasticizer | phr | 50 | 50 | 50 | 50 |
| Aging stabilizer | phr | 4 | 4 | 4 | 4 |
| Stearic acid | phr | 2.5 | 2.5 | 2.5 | 2.5 |
| ZnO | phr | 2.5 | 2.5 | 2.5 | 2.5 |
| Accelerator [j] | phr | 4 | 4 | 4 | 4 |
| Sulfur | phr | 2 | 2 | 2 | 2 |
| Physical properties | | | | | |
| $t_{90}$ | min | 20 | 18 | 12 | 8 |
| Shore hardness at RT | Shore A | 49 | 50 | 62 | 68 |
| Rebound resilience at RT | % | 22 | 21 | 23 | 22 |
| Rebound resilience at 70° C. | % | 40 | 42 | 42 | 43 |
| Tensile strength | MPa | 10 | 8 | 13 | 14 |
| 100 modulus | MPa | 0.8 | 0.9 | 1.6 | 2.0 |
| 300 modulus | MPa | 2.1 | 2.4 | 5.0 | 5.8 |
| E' (0.15%) | MPa | 6.4 | 7.2 | 11.2 | 21.6 |
| E' (8%) | MPa | 2.8 | 3.4 | 4.7 | 5.5 |
| Tan δ (max) at 55° C. | | 0.236 | 0.226 | 0.217 | 0.215 |
| Abrasion | mm³ | 378 | 335 | 185 | 164 |

As can be seen from table 1 by the comparison of C1 vs. I1 (mole for mole exchange of the silane) and I2 vs. C1 and I3 vs. C2, the rubber mixtures of the invention have much higher stiffness, which is manifested in the elevated values of 100 modulus, 300 modulus and E' (at 0.15% elongation) and E' (at 8% elongation). At the same time, the rubber mixtures of the invention have a reduced full vulcanization time $t_{90}$ and elevated tensile strength.

The rubber mixtures of the invention remain at approximately the same level with regard to the trade-off of rolling resistance and wet grip, which can be seen from the indicators of rebound resilience at 70° C. and tan δ (max) at 55° C. for rolling resistance and rebound resilience at room temperature for wet grip. For the use of the rubber mixture of the invention in vehicle tires, especially in treads of vehicle tires, this gives rise to improved handling characteristics and a cost saving in the production of the tires.

As apparent from tables 2 to 4, all rubber mixtures of the invention comprising a silane of formula I) in different embodiments show an increase in stiffness with constant indicators of rolling resistance and/or wet grip on comparison with their respective comparative mixtures comprising a comparable silane from the prior art in an equal molar amount. In some cases, these indicators have even been additionally improved.

On the basis of the comparisons of I4 vs. C3 and I5 vs. C4 in table 2, it is apparent that the inventive rubber mixtures I4 and I5 comprising a silane of formula I), in the mercaptosilane embodiment, exhibit higher stiffnesses (100 modulus; 300 modulus, E' (0.15%); E' (8%)) and tensile strengths than rubber mixtures comprising a mercaptosilane from the prior art. At the same time, the other properties, especially the indicators for the trade-off of wet grip and rolling resistance, remain at the same level or are even improved in some cases.

The corresponding comparison with a blocked mercaptosilane (mercaptosilane with protecting group on the sulfur atom, in this case an acetyl radical) also shows a distinct increase in stiffnesses, with no significant effect on the trade-off of rolling resistance and wet grip, as apparent from the comparison of mixtures C5 (blocked mercaptosilane from the prior art) and I6 (silane of formula I in the blocked mercaptosilane version). Here too, the silane was exchanged mole for mole (equal molar amount) in the formulation proceeding from C5.

As the comparisons of mixtures I8 vs. C7 and I9 vs. C8 show, the rubber mixtures of the invention, with mole for mole exchange of a polysulfanesilane from the prior art for a silane of formula I) in each case, in the polysulfanesilane embodiment, have higher stiffnesses and reduced full vulcanization times $t_{90}$.

Surprisingly, the rubber mixtures I10 and I11 comprising a silane of formula I) in the monosulfanesilane embodiment (n=1) also exhibit high stiffnesses and tensile strengths and reduced full vulcanization times $t_{90}$. In the comparative mixtures C9 and C10, a silane (with equal molar amount) from the prior art which does not bind to polymer chains because of its structure serves as a comparison. It would have been expected that the monosulfanesilane would have to have similar properties to this comparative silane, since there would have to be no significant binding to polymer chains here either.

In addition, the inventive rubber mixtures I10 and I11 exhibit improved indicators of rolling resistance, as apparent from the rebound resiliences at 70° C. and from the maximum loss factor tangent delta (tan δ) at 55° C., and an improved abrasion resistance, apparent from the lower material erosion in the abrasion test. Since the wet grip indicators (decreasing rebound resiliences at RT) are also improved with I10 and I11, these mixtures are actually at an improved level in terms of the trade-off of rolling resistance and wet grip. At the same time, the mixtures I10 and I11 exhibit reduced full vulcanization times, so as to give rise, in the production of vehicle tires, to a cost saving in the vulcanization of the tires.

It is possible with the rubber mixture of the invention, as shown by the various embodiments, for example through the use in the tread of vehicle tires, to improve the handling characteristics of vehicle tires, while the trade-off of rolling resistance and wet grip is not significantly adversely affected or even improved.

At the same time, heating times in vulcanization remain at the same level or are even improved, such that a cost saving is enabled in the production of vehicle tires from the rubber mixture of the invention.

The invention claimed is:

1. A sulfur-crosslinkable rubber mixture comprising:
   at least one diene rubber;
   10 to 200 phr of at least one silica; and,
   2 to 20 phf of at least one silane having the general empirical formula:

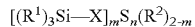

wherein the $R^1$ radicals may be the same or different within one molecule, wherein the $R^1$ radicals selected from the group consisting of alkoxy groups having 1 to 10 carbon atoms, cyclic dialkoxy groups having 2 to 10 carbon atoms, cycloalkoxy groups having 4 to 10 carbon atoms or phenoxy groups, aryl groups having 6 to 20 carbon atoms, alkyl groups having 1 to 10 carbon atoms, alkenyl groups having 2 to 20 carbon atoms, aralkyl groups having 7 to 20 carbon atoms, and halides, wherein X is a polar organic urea-containing group, wherein m assumes the value of 1 or 2, wherein n is an integer from 1 to 8, and wherein $R^2$ is a hydrogen atom or an acyl group having 1 to 20 carbon atoms; and,
   wherein the polar organic urea-containing X group comprises at least one urea derivative as polar functionality which bears an organic hydrocarbyl group on the two nitrogen atoms, wherein the group between the first nitrogen atom of the urea-containing group and the sulfur of the $S_n$ group is aliphatic, and wherein the group between the second nitrogen atom of the urea-containing group and the silicon atom of the $(R^1)_3Si$ group is aliphatic or aromatic.

2. The sulfur-crosslinkable rubber mixture as claimed in claim 1, wherein the polar organic urea-containing X group comprises at least one urea derivative as polar functionality which bears an organic hydrocarbyl group on the two nitrogen atoms, wherein the group between the first nitrogen atom of the urea-containing group and the sulfur of the $S_n$ group is aliphatic, and wherein the group between the second nitrogen atom of the urea-containing group and the silicon atom of the $(R^1)_3Si$ group is aliphatic.

3. The sulfur-crosslinkable rubber mixture as claimed in claim 1, wherein the polar organic urea-containing X group is a 1-ethyl-3-propylurea radical.

4. The sulfur-crosslinkable rubber mixture as claimed in claim 1, wherein the silane has the following structure:

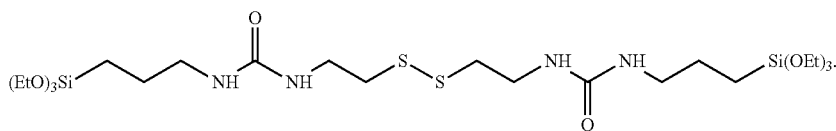

5. The sulfur-crosslinkable rubber mixture as claimed in claim 1, wherein n=1, X=1-ethyl-3-propylurea radical, m=2 and $R^1$=EtO.

6. The sulfur-crosslinkable rubber mixture as claimed in claim 1, wherein n=4, X=1-ethyl-3-propylurea radical, m=2 and $R^1$=EtO.

7. The sulfur-crosslinkable rubber mixture as claimed in claim 1, wherein n=1, X=1-ethyl-3-propylurea radical, m=1, $R^1$=EtO and $R^2$=H.

8. The sulfur-crosslinkable rubber mixture as claimed in claim 1, wherein n=1, X=1-ethyl-3-propylurea radical, m=1, $R^1$=EtO and $R^2$=acetyl.

9. The sulfur-crosslinkable rubber mixture as claimed in claim 1, wherein the mixture comprises 5 to 40 phr of at least one natural polyisoprene and at least one synthetic polyisoprene, and 25 to 85 phr of at least one styrene-butadiene rubber.

10. The sulfur-crosslinkable rubber mixture as claimed in claim 1, wherein the mixture comprises 5 to 40 phr of at least one natural polyisoprene or at least one synthetic polyisoprene, and 25 to 85 phr of at least one styrene-butadiene rubber.

11. The sulfur-crosslinkable rubber mixture as claimed in claim 1, wherein the mixture comprises 5 to 30 phr of at least one natural polyisoprene and at least one synthetic polyisoprene, 25 to 80 phr of at least one styrene-butadiene rubber, and 5 to 50 phr of at least one butadiene rubber.

12. The sulfur-crosslinkable rubber mixture as claimed in claim 1, wherein the mixture comprises 5 to 30 phr of at least one natural polyisoprene or at least one synthetic polyisoprene, 25 to 80 phr of at least one styrene-butadiene rubber, and 5 to 50 phr of at least one butadiene rubber.

13. A vehicle tire comprising a sulfur-crosslinkable rubber mixture, the mixture comprising:
   at least one diene rubber;
   10 to 200 phr of at least one silica; and,
   2 to 20 phf of at least one silane having the general empirical formula:

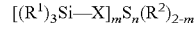

wherein the $R^1$ radicals may be the same or different within one molecule, wherein the $R^1$ radicals selected from the group consisting of alkoxy groups having 1 to 10 carbon atoms, cyclic dialkoxy groups having 2 to 10 carbon atoms, cycloalkoxy groups having 4 to 10 carbon atoms or phenoxy groups, aryl groups having 6 to 20 carbon atoms, alkyl groups having 1 to 10 carbon atoms, alkenyl groups having 2 to 20 carbon atoms, aralkyl groups having 7 to 20 carbon atoms, and halides, wherein X is a polar organic urea-containing group, wherein m assumes the value of 1 or 2, wherein n is an integer from 1 to 8, and wherein $R^2$ is a hydrogen atom or an acyl group having 1 to 20 carbon atoms; and,
   wherein the polar organic urea-containing X group comprises at least one urea derivative as polar functionality which bears an organic hydrocarbyl group on the two nitrogen atoms, wherein the group between the first nitrogen atom of the urea-containing group and the sulfur of the $S_n$ group is aliphatic, and wherein the group between the second nitrogen atom of the urea-containing group and the silicon atom of the $(R^1)_3Si$ group is aliphatic or aromatic.

14. The vehicle tire as claimed in claim 13, wherein the mixture is a component of a tread of the vehicle tire.

15. The vehicle tire as claimed in claim 13, wherein the polar organic urea-containing X group comprises at least one urea derivative as polar functionality which bears an organic hydrocarbyl group on the two nitrogen atoms, wherein the group between the first nitrogen atom of the urea-containing group and the sulfur of the $S_n$ group is aliphatic, and wherein the group between the second nitrogen atom of the urea-containing group and the silicon atom of the (R¹)₃Si group is aliphatic.
16. The vehicle tire as claimed in claim 13, wherein the silane has the following structure:
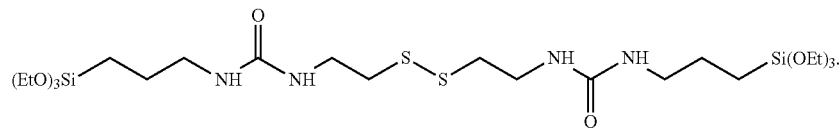
* * * * *